United States Patent Office 3,296,265
Patented Jan. 3, 1967

---

3,296,265
s-TRIAZINE-1,3,5-TRIS (AMMONIUM ALKYL PHOSPHONATES)
Albert Y. Garner, Yellow Springs, Ohio, assignor to Monsanto Research Corporation, St. Louis, Mo., a corporation of Delaware
No Drawing. Filed Sept. 28, 1964, Ser. No. 399,818
2 Claims. (Cl. 260—249.6)

This invention relates to phosphorus-containing heterocyclic nitrogen compounds and more particularly provides a new and valuable class of compounds of melamine with certain phosphonates.

Accordinng to the invention, there are provided s-triazine-1,3,5-tris(ammonium alkyl phosphonates) by the reaction of melamine with water and a lowed dialkyl phosphonate, substantially according to the scheme:

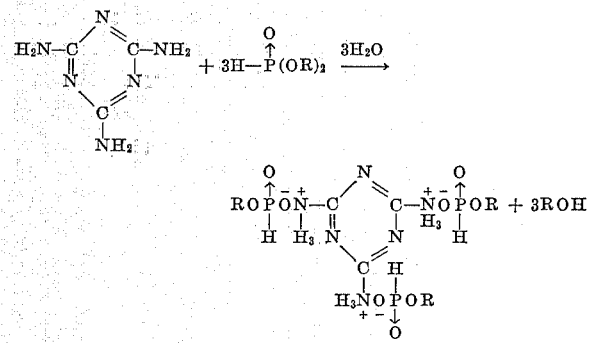

wherein R is a lower alkyl radical, i.e., an alkyl radical of from 1 to 8 carbon atoms.

Useful dialkyl phosphonates include the simple or mixed diesters of phosphonic acid, e.g., dimethyl, dipropyl, dibutyl, diisobutyl, dipentyl, dihexyl, diheptyl, dioctyl, bis(2-ethylhexyl, ethyl methyl, butyl isopropyl, or octyl pentyl phosphonate.

Compounds provided by the invention are ionic salts of melamine with an alkyl mono-ester of phosphonic acid, each of the three amino groups of melamine participating in the reaction to give tris(substituted ammonium) derivatives of s-triazine. Examples of the presently provided ammonium compounds are s-triazine-1,3,5-tris(ammonium methyl phosphonate), s-triazine-1,3,5-tris(ammonium isopropyl phosphonate), s-triazine-1,3,5-tris(ammonium tert-butylphosphonate), s-triazine-1,3,5-tris(ammonium hexyl phosphonate), s-triazine-1,3,5-tris[ammonium bis(2-ethylhexyl) phosphonate], etc.

As shown above, reaction of the dialkyl phosphonate with the melamine to give the ammonium compounds requires the presence of water and involves formation of an alcohol as a by-product. The reaction takes place by simply mixing the two reactants in the presence of water at ordinary, decreased or increased temperature and in the presence or absence of an extraneous, inert organic liquid as diluent or solvent. The reaction is generally exothermic; hence, application of heat is usually unnecessary. However, in order to assure complete reaction, heating at a temperature of up to, say 125° C. may be employed. A temperature of within a range of, say, from 15° C. to 125° C. is generally useful, operation at the higher temperatures within this range being conducted after the initial spontaneous temperature rise has subsided, in order to effect complete reaction within the shortest time. Since reaction occurs by participation of one mole of the amine and three moles each of the phosphonate and the water, these materials are advantageously present in at least the stoichiometric proportions; however, an excess of the phosphonate may be present, and such excess may conveniently serve as diluent. When an extraneous diluent or solvent is used, it may be any organic liquid which is inert under the reaction conditions, e.g., methanol or ethanol or another lower alkanol, ether, dioxane, dimethyl sulfoxide, hexane or benzene. Although water should be present in an amount which is at least thrice equimolar with respect to the melamine, it is not generally recommended that it be used as the diluent, particularly when substantial heating is employed, since hydrolysis of either the ester reactant or the ester product may occur in the presence of large quantities of water. It will usually be found that commercial preparations of the phosphonate and/or the melamine and/or the diluent or solvent, when one is employed, often may contain sufficient moisture to furnish the required three molar equivalents of water.

Progress of the reaction may generally be followed by noting the appearance and disappearance of exothermic reaction and subsequent change in viscosity of the reaction mixture. When no further change is evidenced, the reaction product consists of the tri-ammonium compound and the alcohol by-product and diluent or solvent when one has been employed. Generally, the tri-ammonium compound may be obtained by simply evaporating the alcohol and possible diluent. Thus, concentration of the crude reaction mixture by heating generally gives a residue which crystallizes to the tri-ammonium compound upon cooling. However, the presently provided melamine/phosphonate reaction products may be readily separated from the reaction mixture by any of the isolating procedures known to the art, e.g., by solvent extraction, precipitation from a non-solvent, fractional distillation, etc. The present tri-ammonium compounds are generally soluble in the lower alkanols and insoluble in ether and acetone. These solubility characteristics are advantageously relied upon if it is desired to obtain a very pure product by precipitation, washing, and recrystallization.

The presently provided s-triazine-1,3,5-tris(ammonium alkyl phosphonates) are stable, well-defined compounds which range from viscous liquids to crystalline solids. They possess very good thermal stability, being unaffected by heating to well above 300° C. and are advantageously employed as flame-proofing agents for synthetic polymers and cellulosic fibers and textiles. The present compounds also serve as anti-static agents, whereby with one treatment fibers and textile products made therefrom are simultaneously flameproofed and de-staticized. Owing to their very high thermal stability the present tris-ammonium compounds may be incorporated into the polymeric materials at various stages of their production; for example, when used with the polyurethanes, they are advantageously added before the hardening step or together with the blowing agent when foamed materials are desired.

The invention is further illustrated by, but not limited to, the following example.

*Example*

A mixture consisting of 12.6 g. (0.1 mole) of melamine, 50 ml. (slight molar excess) of diethyl phosphonate and 10 ml. of water was prepared. It warmed spontaneously to 40° C. The mixture was then warmed on the steam bath for one hour. Since all of the solids had not dissolved by this time, ethanol was added to the reaction mixture and warming on the steam bath was continued for another hour. The mixture was then filtered while hot, and the filtrate was concentrated to 200 ml. Upon cooling, this concentrate crystallized to give 26.4 g. of the substantially pure s-triazine-1,3,5-tris(ammonium ethyl phosphonate) of the structure

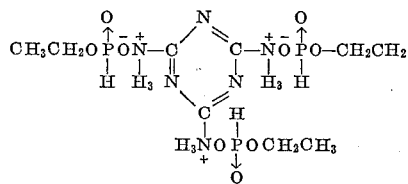

An additional 3.7 g. of the same crystalline compound was obtained upon pouring the mother liquor into ether.

The compound softened at 330–340° C., but although it became slightly discolored, it did not melt when heated to 360° C. It gave a clear melt in an oxygen-gas flame, leaving a residue in spite of the excessive heat to which it had been subjected. The compound gave an acidic, aqueous solution and dissolved in methanol but not in ether or acetone. It analyzed 24.21% carbon and 18.44% nitrogen as against 23.70% and 18.42% the respective calculated values for $C_3H_9N_2O_3P$, the empirical formula for the above-depicted structure.

The infrared spectrum showed P—H and P→O absorption as well as absorption of the $NH_4^+$ type.

Operating as above, other s-triazine-1,3,5-tris(ammonium alkyl phosphonates) of high thermal stability are similarly obtainable; for example, by replacing the diethyl phosphonate, which is shown above, with another lower dialkyl phosphonate, e.g., with diisopropyl phosphonate or di-n-octyl phosphonate to obtain s-triazine-1,3,5-tris(ammonium isopropyl phosphonate) or s-triazine-1,3,5-tris(ammonium n-octyl phosphonate).

Thus, the present invention is not to be considered as limited by the above example, which is given by way of illustration, only. It will be obvious to those skilled in the art that many modifications can be made within the spirit of the invention, which is limited only by the terms of the appended claims.

What I claim is:
1. The compound of the formula

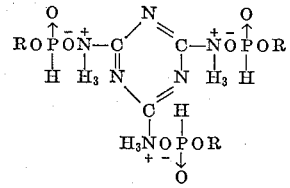

in which R is an alkyl radical of from 1 to 5 carbon atoms.

2. The compound defined in claim 1, further limited in that R is ethyl.

References Cited by the Examiner
UNITED STATES PATENTS

| | | | |
|---|---|---|---|
| 2,930,730 | 3/1960 | Scott | 260—925 |
| 3,053,769 | 9/1962 | Zajac | 260—295 |

WALTER A. MODANCE, *Primary Examiner.*

JOHN D. RANDOLPH, *Examiner.*

J. M. FORD, *Assistant Examiner.*